(12) United States Patent
Goncalves

(10) Patent No.: US 8,068,674 B2
(45) Date of Patent: Nov. 29, 2011

(54) UPC SUBSTITUTION FRAUD PREVENTION

(75) Inventor: Luis Goncalves, Pasadena, CA (US)

(73) Assignee: Evolution Robotics Retail, Inc., Pasadena, CA (US)

( * ) Notice: Subject to any disclaimer, the term of this patent is extended or adjusted under 35 U.S.C. 154(b) by 1091 days.

(21) Appl. No.: 11/849,503

(22) Filed: Sep. 4, 2007

(65) Prior Publication Data

US 2009/0060259 A1 Mar. 5, 2009

(51) Int. Cl.
*G06K 9/00* (2006.01)
*G06K 9/20* (2006.01)
*G06K 9/66* (2006.01)
*G06K 7/00* (2006.01)
*G06K 7/10* (2006.01)

(52) U.S. Cl. ........ 382/194; 382/321; 382/312; 382/113; 382/183; 235/462.01

(58) Field of Classification Search .......... 382/100–103, 382/113, 162, 167, 190, 192, 194, 183, 212, 382/219, 209, 312, 313, 321, 276; 235/462.01, 235/383; 713/176
See application file for complete search history.

(56) References Cited

U.S. PATENT DOCUMENTS

| 3,296,368 A | * | 1/1967 | Lohmann | ......................... 348/26 |
| 3,446,557 A | * | 5/1969 | Wilkinson | ..................... 356/325 |
| 4,792,018 A | | 12/1988 | Humble et al. | |
| 4,843,569 A | * | 6/1989 | Sawada et al. | ................ 382/180 |
| 4,929,819 A | | 5/1990 | Collins, Jr. | |
| 5,058,181 A | * | 10/1991 | Ishihara et al. | ............... 382/199 |
| 5,115,888 A | | 5/1992 | Schneider | |
| 5,495,097 A | | 2/1996 | Katz et al. | |
| 5,543,607 A | | 8/1996 | Watanabe et al. | |
| 5,609,223 A | | 3/1997 | Lizaka et al. | |
| 5,666,467 A | * | 9/1997 | Colak | ............................. 706/33 |
| 5,744,381 A | * | 4/1998 | Tabata et al. | .................... 438/16 |

(Continued)

FOREIGN PATENT DOCUMENTS

EP 0672993 9/1995

(Continued)

OTHER PUBLICATIONS

Hewitt et al. "Enforcing 3D Constraints to Improve Object and Scene Recognition" British Machine Vision Conference (2007) pp. 1-10.*

(Continued)

*Primary Examiner* — Jason M Repko
*Assistant Examiner* — Mia M Thomas
(74) *Attorney, Agent, or Firm* — Stoel Rives LLP

(57) ABSTRACT

A system and method for detecting fraudulent identification tags, such as Universal Product Codes (UPC) applied to goods to be purchased is disclosed. Images of the goods to be purchased and corresponding feature models are stored in a database. When a customer desires to purchase an item containing a UPC, a scanned image of the item about to be purchased may be acquired and a feature model of the scanned image may be created. The system may retrieve from the database the image and feature model previously stored for the item associated with the just-scanned UPC. A variety of image processing techniques may be used to compare the scanned and database images and/or the scanned and database feature models. In one embodiment, these image processing techniques may include determining a geometric transformation that maps the features of the scanned image onto the features of a database model.

25 Claims, 6 Drawing Sheets

U.S. PATENT DOCUMENTS

| | | | |
|---|---|---|---|
| 5,883,968 A | 3/1999 | Welch et al. | |
| 5,890,817 A * | 4/1999 | Ackley | 400/103 |
| 5,901,246 A * | 5/1999 | Hoffberg et al. | 382/209 |
| 5,917,798 A * | 6/1999 | Horimai et al. | 369/103 |
| 5,920,477 A * | 7/1999 | Hoffberg et al. | 382/181 |
| 5,923,034 A * | 7/1999 | Ogasawara et al. | 250/311 |
| 5,967,264 A | 10/1999 | Lutz et al. | |
| 6,050,399 A * | 4/2000 | Pratt | 206/158 |
| 6,069,696 A | 5/2000 | McQueen et al. | |
| 6,118,535 A * | 9/2000 | Goldberg et al. | 356/521 |
| 6,137,295 A * | 10/2000 | Yoshida | 324/754.22 |
| 6,177,218 B1 * | 1/2001 | Felker et al. | 430/30 |
| 6,179,206 B1 | 1/2001 | Matsumori | |
| 6,233,044 B1 * | 5/2001 | Brueck et al. | 355/67 |
| 6,236,736 B1 | 5/2001 | Crabtree et al. | |
| 6,332,573 B1 | 12/2001 | Gu et al. | |
| 6,363,366 B1 | 3/2002 | Henty | |
| 6,550,583 B1 | 4/2003 | Brenhouse | |
| 6,598,791 B2 | 7/2003 | Bellis, Jr. et al. | |
| 6,606,579 B1 | 8/2003 | Gu | |
| 6,671,386 B1 * | 12/2003 | Shimizu et al. | 382/100 |
| 6,711,293 B1 * | 3/2004 | Lowe | 382/219 |
| 6,809,845 B1 * | 10/2004 | Kim et al. | 359/9 |
| 6,915,008 B2 | 7/2005 | Barman et al. | |
| 6,973,207 B1 * | 12/2005 | Akopyan et al. | 382/143 |
| 7,044,370 B2 | 5/2006 | Bellis, Jr. et al. | |
| 7,100,824 B2 * | 9/2006 | Ostrowski et al. | 235/383 |
| 7,203,634 B2 | 4/2007 | Jayaram et al. | |
| 7,246,745 B2 | 7/2007 | Hudnut | |
| 7,334,729 B2 * | 2/2008 | Brewington | 235/383 |
| 7,337,960 B2 * | 3/2008 | Ostrowski et al. | 235/383 |
| 7,388,979 B2 * | 6/2008 | Sakai et al. | 382/149 |
| 7,412,089 B2 * | 8/2008 | Squires et al. | 382/141 |
| 7,448,542 B1 * | 11/2008 | Bobbitt et al. | 235/383 |
| 7,461,785 B2 * | 12/2008 | Crockett et al. | 235/383 |
| 7,477,780 B2 | 1/2009 | Boncyk et al. | |
| 7,550,745 B2 * | 6/2009 | Brown | 250/461.1 |
| 7,551,782 B2 * | 6/2009 | Haim Lev | 382/209 |
| 7,711,140 B2 * | 5/2010 | Long et al. | 382/100 |
| 7,720,711 B2 * | 5/2010 | Taylor | 705/16 |
| 7,769,236 B2 * | 8/2010 | Fiala | 382/225 |
| 7,780,084 B2 * | 8/2010 | Zhang et al. | 235/462.11 |
| 7,841,522 B2 * | 11/2010 | Fortenberry | 235/383 |
| 7,909,248 B1 * | 3/2011 | Goncalves | 235/383 |
| 2001/0007498 A1 * | 7/2001 | Arai et al. | 356/401 |
| 2001/0050931 A1 * | 12/2001 | Iso | 372/25 |
| 2001/0053242 A1 * | 12/2001 | Okada | 382/145 |
| 2002/0007337 A1 * | 1/2002 | Schade et al. | 705/37 |
| 2002/0019729 A1 * | 2/2002 | Chang et al. | 703/6 |
| 2002/0120920 A1 | 8/2002 | Jayaram et al. | |
| 2002/0138374 A1 | 9/2002 | Jennings et al. | |
| 2003/0013022 A1 * | 1/2003 | Czech et al. | 430/5 |
| 2003/0021462 A1 * | 1/2003 | Sakai et al. | 382/144 |
| 2003/0026588 A1 | 2/2003 | Elder | |
| 2003/0070075 A1 * | 4/2003 | Deguillaume et al. | 713/176 |
| 2003/0090681 A1 * | 5/2003 | Jones et al. | 356/614 |
| 2003/0135846 A1 | 7/2003 | Jayaram et al. | |
| 2003/0184440 A1 * | 10/2003 | Ballantyne | 340/568.5 |
| 2003/0223631 A1 * | 12/2003 | Ine | 382/145 |
| 2004/0066962 A1 * | 4/2004 | Sasa et al. | 382/141 |
| 2004/0111324 A1 * | 6/2004 | Kim | 705/22 |
| 2005/0046624 A1 | 3/2005 | Jayaram et al. | |
| 2005/0060324 A1 | 3/2005 | Johnson et al. | |
| 2005/0173527 A1 | 8/2005 | Conzola | |
| 2005/0189411 A1 * | 9/2005 | Ostrowski et al. | 235/383 |
| 2005/0189412 A1 * | 9/2005 | Hudnut et al. | 235/383 |
| 2005/0213109 A1 | 9/2005 | Schell et al. | |
| 2005/0223031 A1 | 10/2005 | Zisserman et al. | |
| 2005/0238221 A1 * | 10/2005 | Hirano et al. | 382/144 |
| 2005/0242568 A1 * | 11/2005 | Long et al. | 283/72 |
| 2006/0110025 A1 * | 5/2006 | Ho et al. | 382/144 |
| 2006/0192959 A1 * | 8/2006 | Manolopoulos et al. | 356/364 |
| 2006/0239535 A1 * | 10/2006 | Takada et al. | 382/145 |
| 2006/0261157 A1 * | 11/2006 | Ostrowski et al. | 235/383 |
| 2006/0269136 A1 * | 11/2006 | Squires et al. | 382/181 |
| 2006/0283943 A1 * | 12/2006 | Ostrowski et al. | 235/383 |
| 2007/0064993 A1 * | 3/2007 | Oaki et al. | 382/144 |
| 2007/0172112 A1 * | 7/2007 | Paley et al. | 382/154 |
| 2007/0258635 A1 * | 11/2007 | Kim et al. | 382/144 |
| 2009/0001165 A1 * | 1/2009 | Zhang et al. | 235/462.11 |
| 2009/0060259 A1 * | 3/2009 | Goncalves | 382/100 |
| 2009/0152348 A1 | 6/2009 | Ostrowski | |
| 2010/0059589 A1 * | 3/2010 | Goncalves et al. | 235/383 |
| 2011/0129154 A1 * | 6/2011 | Shimodaira | 382/190 |

FOREIGN PATENT DOCUMENTS

| | | |
|---|---|---|
| EP | 0689175 | 12/1995 |
| EP | 0843293 | 5/1998 |
| WO | PCT/US05/006079 * | 2/2005 |

OTHER PUBLICATIONS

Song et al. "Unsupervised Learning of Human Motion" IEEE Transactions on Pattern Analysis and Machine Intell. vol. 25, No. 7 Jul. 2003 pp. 1-14.*

* cited by examiner

UPC SUBSTITUTION FRAUD PREVENTION

BACKGROUND INFORMATION

The field of the present disclosure relates to systems and methods for fraud prevention, and more particularly, to systems and methods for prevention of fraud due to the substitution of machine-readable identification tags.

The use of machine-readable identification tags on goods has become ubiquitous in many industries. Optically readable tags, such as barcodes, enable the quick and automated identification of goods. For example, in the retail industry the Uniform Product Code (UPC) barcode is widely used. There are many other uses of barcodes, such as identifying industrial goods in factories and warehouses and in luggage handling systems. Non-optical identification tags, such as radio frequency identification (RFID) tags, are becoming increasingly popular.

With the expansion of the use of machine-readable identification tags there has been an increase in the occurrence of fraudulent identification tags, particularly with UPC barcodes in the retail environment. Such fraud will typically involve the perpetrator applying to an item to be purchased the UPC barcode for a less costly item. Several methods to circumvent UPC barcode substitution fraud have been employed. One method is to rely on a checkout clerk to read the description of a scanned item on the point of sale (POS) terminal and to visually inspect the item to see if it matches the description. This method is slow, and is prone to human error. This method is also not effective against unscrupulous checkout clerks.

Another method used to deter UPC barcode substitution fraud is found in U.S. Pat. No. 5,115,888 to Schneider, which discloses a self-service checkout system in which scanned items are weighed. The measured weight of the scanned item is compared to an expected weight corresponding to the scanned UPC barcode. Supervisory personnel are alerted if a discrepancy in the two weights is found. The system may not be able, however, to distinguish a fraudulent UPC barcode in many cases where the item having the fraudulent UPC barcode weighs about the same as the expected item.

A system that verifies both the weight and the shape of an item to be purchased is disclosed in U.S. Pat. No. 4,792,018 to Humble. In this patent, a self-service checkout system weighs and obtains a silhouette of an item being scanned. The weight and silhouette characteristics are compared to an expected weight and silhouette previously stored in a database to determine if the UPC barcode is fraudulent. While some degree of security is provided in this system, this system is not useful where the weight and shape of the legitimate and fraudulent product are similar.

U.S. Pat. No. 5,883,968 to Welch et al. discloses a system that compares the color information of a scanned item with the color information of the item associated with the scanned UPC barcode. This is done by acquiring a color image of the item and then generating color histograms from the image. The color histograms are then compared to the color histogram of the expected item. However, this system may not be effective in situations where the two items being compared have the same color information, but differ in more subtle ways, such as the name or model number. Also, this system may not work well where the conditions under which the image of the item stored in the database differ from those of the scanned item. For example, differences in lighting, viewing angle and distance from the camera may result in the same item appearing different enough to be identified as a different item. The result may be an incorrect identification of a legitimate transaction as being fraudulent, which is undesirable.

As can be seen, there is a need for a system and method for detecting the presence of fraudulent identification tags, such as UPC barcodes. There is a also a need for a system that can detect fraudulent identification tags, which does not rely on human input, is fast and can tolerate different image acquisition conditions. There is a further need for a system that can effectively detect fraudulent identification tags with very few instances of legitimate transactions being identified as fraudulent.

SUMMARY OF THE DISCLOSURE

In one aspect of the disclosure, a method of confirming the identity of an item having an identifier, comprises: acquiring an image of the item having the identifier; extracting a first set of geometric point features from the image of the item; reading identification code data from the identifier on the item; retrieving a second set of geometric point features from a feature database based on the identification code data, the database comprising geometric point features associated with a plurality of known items; comparing the first set of geometric point features from the image with the second set of geometric point features corresponding to the identification code data; and determining whether the item in the image corresponds to the identification code data read from the identifier on the item based on comparison of the first set of geometric point features with the second set of geometric point features.

In another aspect of the disclosure, a system for confirming the identity of an object having an identification code comprises: a scanner comprising a visual sensor for capturing at least one image of the item with the identification code; a feature extractor coupled to the visual sensor for extracting geometric point features from the at least one image; a database comprising a plurality of feature models, each feature model comprising one or more geometric point features associated with one of a plurality of known items; and a processor configured to: compare extracted geometric point features to at least one of the plurality of feature models associated with the identification code with the item; and determine whether the item in the image corresponds to the identification code with the item based on comparison of the extracted geometric point features with the plurality of feature models.

In a further aspect of the disclosure, a method of preventing fraudulent purchases of products having identification codes comprises: scanning an identification code of a product using a point of sale system; acquiring an image of the product; generating geometric feature data from the acquired image of the product; retrieving feature data associated with merchandise based on the scanned identification code; identifying matching features between the generated feature data and the retrieved feature data based on the geometric transform; generating a geometric transform for mapping the generated feature data to the retrieved feature data; and generating an alert if the number of identified matching features is below a predetermined threshold.

In an additional aspect of the disclosure, a method of verifying the identity of an item having an identifier, the method comprises: acquiring an image of the item having the identifier; reading identification code data from the identifier on the item; extracting a first set of geometric point features from the image of the item; comparing the first set of geometric point features from the image with geometric point features from a feature database, the geometric point features from the database being associated with a plurality of known items; retrieving identification code data from the feature database based on a match between the first set of geometric point features and one of the plurality of known items; and determining whether the identification code data read from the identifier on the item matches the identification code data retrieved from the feature database.

These and other features, aspects and advantages of the present disclosure will become better understood with reference to the following drawings, description and claims.

DETAILED DESCRIPTION OF THE EMBODIMENTS

The following detailed description is of the best currently contemplated modes of carrying out the embodiments. The description is not to be taken in a limiting sense, but is made merely for the purpose of illustrating the general principles of the invention, since the scope of the invention is best defined by the appended claims.

The present disclosure generally provides a system and method for detecting fraudulent Universal Product Codes (UPC) applied to goods to be purchased by storage in a database images of the goods to be purchased and feature models of these images. When a customer desires to purchase an item containing a UPC, a scanned image of the item about to be purchased may be acquired and a geometric point feature model of the scanned image may be created. The system for UPC fraud detection may retrieve from the database the image and geometric point feature model previously stored for the item associated with the just-scanned UPC. A variety of image processing techniques may be used to compare the scanned and database images and/or the scanned and database feature models. In one embodiment, these image processing techniques may include determining a geometric transformation that maps the features of the scanned image onto the features of a database model. By using these image processing techniques, the embodiment may account for variations in the scanned and database images that might be present even when the item and UPC are legitimate. The result is a verification system that is highly reliable and which produces little false detection of fraudulent UPC codes.

Prior UPC verification systems were not as effective in detecting fraudulent UPC codes. For example, systems which relied on the checkout person comparing the product description on the POS terminal screen to a visual inspection of the product were impracticably slow or were subject to a high degree of human error. Other prior UPC verification systems relied on image analysis techniques that used color histograms. These kinds of systems are not effective in detecting subtle differences in product appearance. In the present disclosure, the use of a geometric point feature model analysis on the scanned and database images results in the ability to detect very slight differences between the scanned and database images. One example would be two products that appear identical except for different model numbers appearing on the packages. In particular, the difference would not be discernable with an approach based on color histograms.

Figure 1:
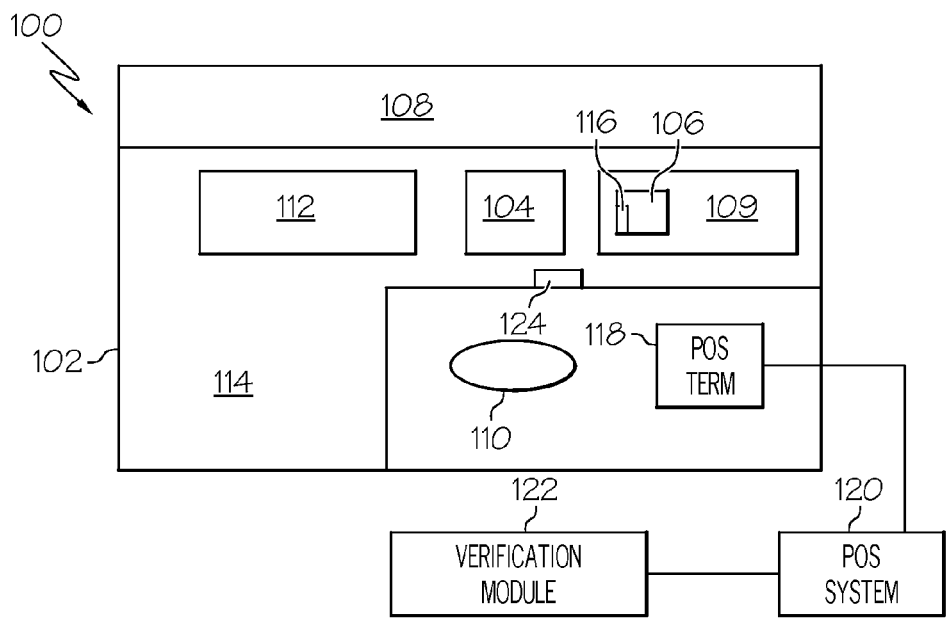
FIG. 1 is a schematic view of a checkout station having a system for merchandise checkout in accordance with one embodiment.

FIG. 1 is a top view of a system 100 for Universal Product Code (UPC) fraud detection in accordance with one embodiment of the present disclosure. FIG. 1 illustrates an exemplary application of the system 100 that is capable of detecting fraudulent UPC codes during product scanning. For purposes of illustration, the system 100 is described as a tool for reading a UPC code 116 on an item 106 to be purchased and detecting whether the UPC code 116 is fraudulent or not. However, it should be apparent to those of ordinary skill that the system 100 can also be used to detect fraudulent or incorrect UPC codes in various applications based on the same principles as described hereinafter. For example, the system 100 may be used to detect fraudulent or incorrect UPC codes, in environments where UPC codes are read using fixed or handheld UPC readers, in various kinds of retail environments or in non-retail environments, such as factories, warehouses and luggage handling systems. The system 100 may also be used to detect fraudulent or incorrect identification tags besides UPC codes, such as radio frequency identification (RFID) tags.

As illustrated in FIG. 1, a checkout station 102 may include an optical sensor 104 and a feed belt 109. A customer (not shown) wishing to purchase items may enter a cart aisle 108 adjacent the checkout station 102 and place an item 106 to be purchased on the feed belt 109. A checkout clerk 110 may grasp item 106 to be purchased, pass the item over the optical sensor 104 and then place the item on the take-away belt 112. The take-away belt 112 may carry each item 106 to the bagging area 114. The optical sensor 104 may ascertain the unique UPC 116, or other identification code, affixed to the item 106 and pass UPC identification code data to a point of sale (POS) terminal 118. The POS terminal 118 may communicate the ascertained UPC to a central POS system 120.

The optical sensor 104 may comprise a device that performs the functions of both scanning/decoding the UPC 116 as well as capturing one or more images of the item 106 for feature analysis. A conventional barcode scanner (not shown) in the optical sensor 104 may optically scan the item's UPC 116 and provide data representing the scanned UPC 116 to the POS terminal 118. Alternatively, numbers on the UPC 116 of an item 106 can be manually keyed into the system at the POS terminal 118 by the checkout clerk 110. The optical sensor 104 also may comprise a means for capturing an image of the item 106, such as an imager or two-dimensional (2D) optical sensor, and the like. The optical sensor 104 may include conventional refractive lenses as well as special-purpose lenses such as wide-angle lenses, fish-eye lenses, omni-directional lenses, and the like. Further, the optical sensor 104 may include reflective surfaces, such as planar, parabolic, or conical mirrors, which may be used to provide a relatively large field of view or multiple view-points.

Information from the optical sensor 104, including data representing the scanned UPC 116, as well as the information representing an image of the item 106, may be communicated to the POS terminal 118, the POS system 120 and to a verification module 122. According to the system and method of the present disclosure, verification module 122 may determine if the UPC 116 read by the optical sensor 104 is likely to be the correct identification code that has previously been associated with the item 106. Since the UPC will determine the price charged for the item 106, if the wrong UPC 116 has been affixed to the item 106, either by mistake or by fraud, the wrong price may be charged for the item 106. In particular, the verification module 122 may determine if there is a likelihood that the wrong UPC 116 is attached to the item. If so, it may send a signal to the POS terminal 118 to alert the checkout person 110 to take appropriate steps to prevent a sale from occurring. Alternatively, the verification module 122 may automatically suspend the transaction by temporarily locking the POS terminal until the checkout person confirms whether the item should be charged at the price corresponding to the UPC. One way for the checkout person 110 to respond to a signal that a fraudulent UPC 116 may be on the item 106 would be, for example, to read the description of the item associated with the scanned UPC 116 on the POS terminal 118 and to compare that description to the actual markings on the item 106.

The verification module 122 may compare an image of the item 106 obtained by the optical sensor 104 (hereinafter referred to as the "scanned image model") to a previously obtained image model of the correct item that should be associated with the UPC 116 (hereinafter referred to as the "database model"). It will be appreciated by those skilled in the art that, in general, there are many ways that the scanned image of the item 106 may differ from the database image, even if they are both images of identical items. For example, differences in lighting, viewing angle and distance from the optical sensor 104 may cause two images of identical items to appear different enough for a verification system to mistakenly identify identical items as different items. In accordance with the present disclosure, the verification module 122 uses robust image processing techniques that can account for such differences, as described in detail below.

While the image processing technique of the present disclosure is able to consistently identify objects over a wide range of distances between the sensor 104 and item, scanned images may be captured at a distance approximate to collect enough visual features to verify the product. Accordingly, a distance indicator 124 receives information from a distance estimator 125 (shown in FIG. 2), which may measure the distance of the item 106 to the optical sensor 104 and compare that distance to an optimum distance. The optimum distance may be the distance at which the database image was captured, a distance sufficient to capture an image of a complete side of the item to be purchased, or a distance sufficient to capture enough of the packaging to identify the product. This distance measurement may be made, for example with conventional laser or ultrasonic distance sensors. In an alternative embodiment, the relative position of the sensor can be predicted based on (a) the size of the UPC barcode in the scanned image and (b) the ratio of the item's size to that of the barcode. If the sensor is not at the proper distance or the barcode not of the correct proportion, the distance indicator 124 may indicate to the checkout clerk 110 by, for example, a visual or auditory display, whether the item 106 needs to be re-read at a smaller or a greater distance to obtain a usable image.

Figure 2:
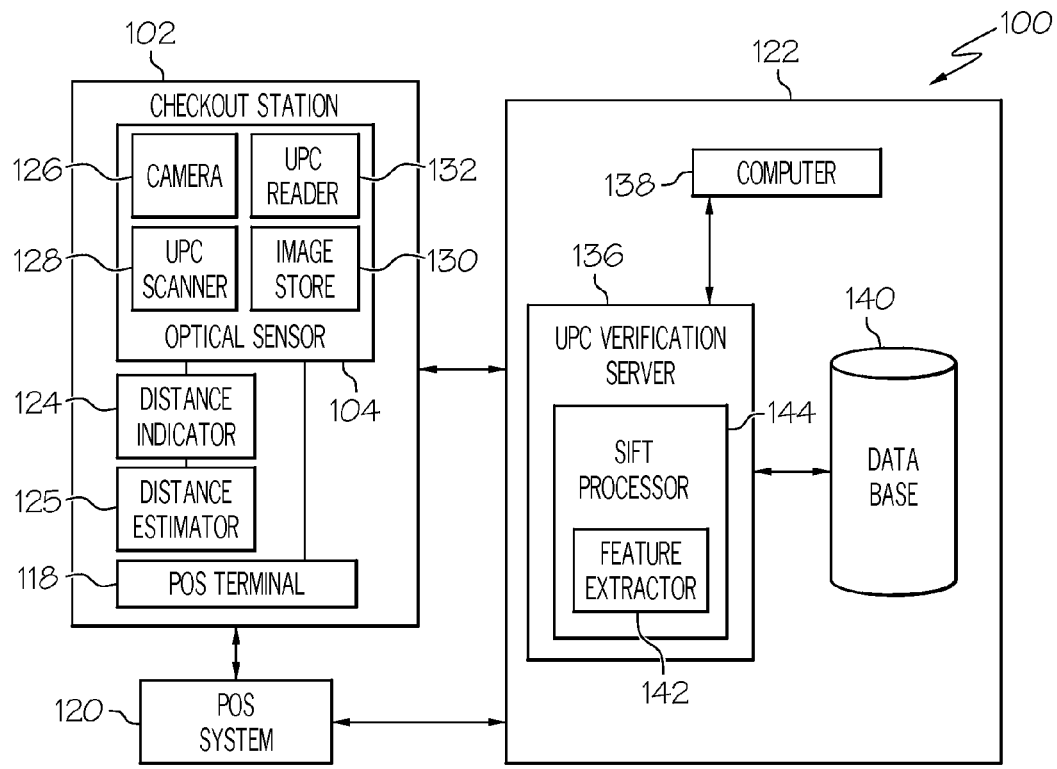
FIG. 2 is a schematic block diagram of one embodiment of the system for merchandise checkout in FIG. 1.

FIG. 2 is a schematic diagram of one embodiment of the system 100 shown in FIG. 1. It will be understood that the system 100 and verification module 122 in particular, may be implemented in a variety of ways, such as by dedicated hardware, by software executed by a microprocessor, by firmware and/or computer readable medium executed by a microprocessor or by a combination of both dedicated hardware and software. Also, for simplicity, only one checkout station 102 is shown coupled to the verification module 122 in FIG. 1. However, it should be apparent to those of ordinary skill that any number of checkout stations 102 may be connected to the verification module 122 without deviating from the spirit and scope of the present disclosure.

The optical sensor 104 in the checkout station 102 may include a UPC scanner 128, a camera 126, an image storage unit 130, a UPC detector and reader 132, a distance estimator 125, a distance indicator 124, and an output interface. Checkout station 102 may communicate with the verification module 122 via an appropriate interface, such as a direct connection or a networked connection. This interface may be hard wired or wireless. Examples of interface standards that may be used include, but are not limited to, Ethernet, IEEE 802.11, Bluetooth, Universal Serial Bus and the like.

Verification module 122 may include a UPC verification server 136, a computer 138 and a database 140. The computer 138 may be a PC, a server computer, or the like and may be equipped with a network communication device such as a network interface card, a modem, infra-red (IR) port, or other network connection device suitable for connecting to a network. The computer 138 may be connected to a network such as a local area network or a wide area network, such that information, including information about merchandise sold by the store, may be accessed from the computer 138. The computer 138 may execute an appropriate operating system, as is well known in the art.

The computer 138 may be connected to a UPC verification server 136 that may provide the database information stored in the database 140. In an alternative embodiment, the computer 138 and the UPC verification server 136 may be combined into a single unit. Before the system 100 can operate, the database 140 may first be stored with the database images and geometric point feature models of each possible item 106 that might be expected to be processed by the checkout system 102. As described below, a geometric point feature model is a set of features that are identified in an image, which are useful for some image processing techniques. Gathering the necessary data into the database 140 may require capturing an image of each item 106 and processing that image using the geometric feature model extraction process described below. Once the database 140 is stored with the database images and the geometric point feature models for each item, the system 100 may be ready for use.

An overview of the process for UPC substitution fraud prevention is as follows. The UPC 116 on the item 106 may first be scanned by the UPC scanner 128. The UPC detector and decoder 132 may interpret the scanner output and generate and communicate this information to the POS system 118, which may identify the item 106 that should be associated with the UPC 116. The POS system 118 may then transmit this information to the UPC verification module 122. Concurrently, the camera 126 may capture an image of the item 106 and transmit this image data to the verification module 122. In some embodiments, the same sensor serves as the camera to provide an image used for both UPC decoding and item verification. The feature extractor 142 may generate a geometric feature model of the image of the item just captured for later comparison with the geometric feature model from the database image associated with the just scanned UPC 116. In one embodiment of the disclosure, the feature extractor 142 uses a scale-invariant feature transformation (SIFT) process to extract the features. The verification module 122 then compares the visual feature model of the image with the geometric feature model from the database to determine a geometric transformation that accurately aligns the two models. If the result of this comparison is an indication that the two models match, the purchase of the item may proceed without interruption. However, if this analysis determines that the two items do not match, there is a likelihood that the UPC is fraudulent and the verification module 122 will send a signal to the POS terminal 118 indicating that the purchase should not proceed.

Figure 3:
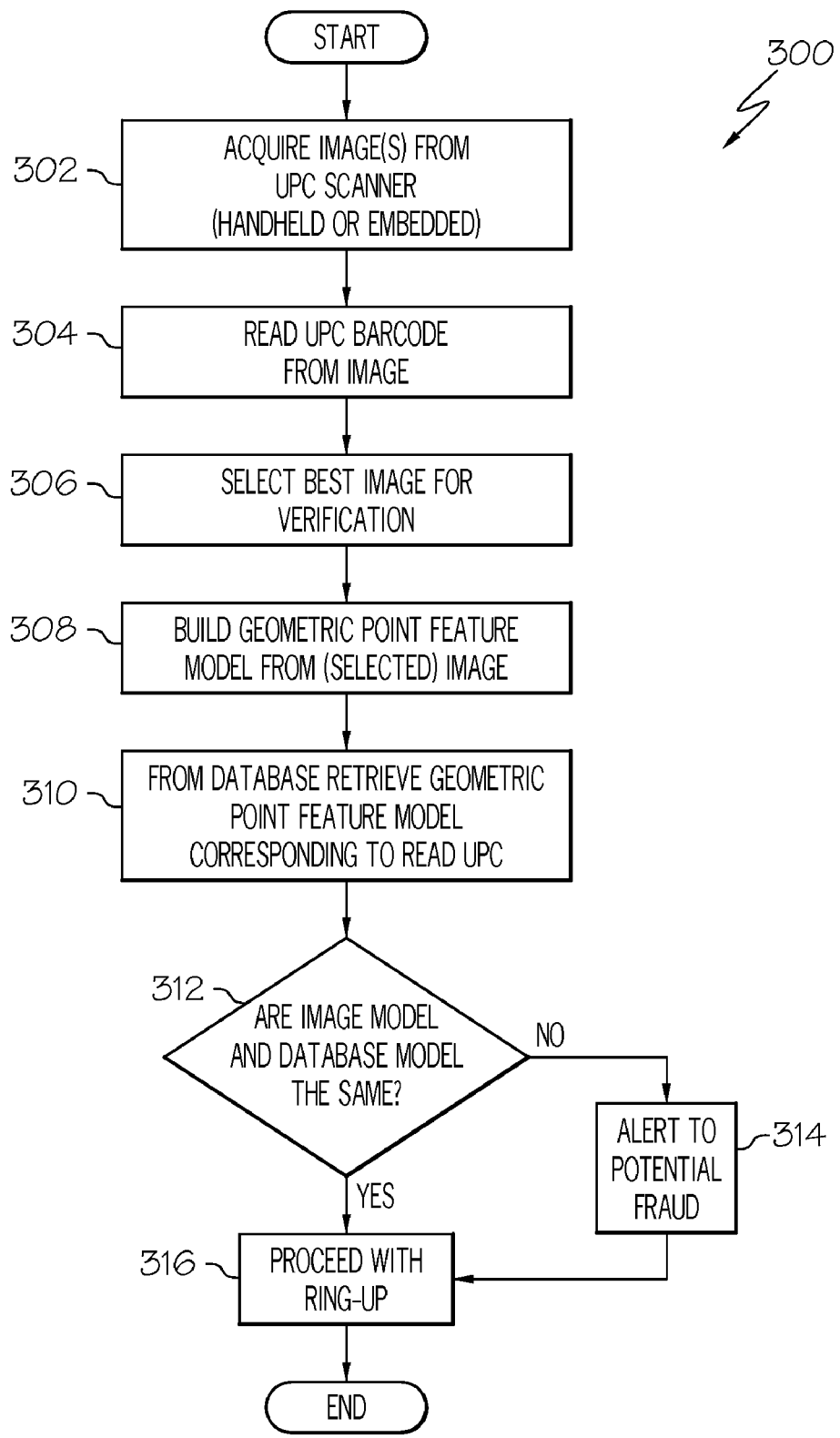
FIG. 3 is a flowchart that illustrates a process for UPC substitution fraud prevention in accordance with one embodiment.

FIG. 3 is a flowchart of a process 300 for detecting UPC substitution fraud in accordance with one embodiment of the disclosure. In step 302 a plurality of scanned images of the item 106 may be acquired by the optical sensor 104. This may be done by the camera 126 obtaining images of the item 106 and storing the images in an image storage unit 130. In step 304 the UPC 116 may be read, which may be accomplished by UPC scanner 128 scanning the UPC 116 and transmitting the information to the UPC reader 132. Alternatively, the UPC 116 may be read from one of the scanned images obtained by the camera 126 and stored in the image storage unit 130.

Among the scanned images obtained by the camera 126, the best image for use in the verification process may then be selected in step 306. One way to do this may be to retrieve a geometric point feature model of the database image that corresponds to the UPC 116 that has just been read. By using the geometric point feature model and the appearance of the UPC 116, a prediction of the amount of area of the package that is visible in the scanned image may be made. The scanned image with the greatest area of package visible may be selected. Having a larger area of package visible may increase the number of features that may be identified, thereby improving the performance of the system 100. One way to do this is to compare the relative size of the UPC from the scanned image with respect to the model to determine what percentage of the item is visible. If no suitable image is found, the distance indicator 124 may be used to instruct the check-out person 110 to increase or decrease the distance between the UPC scanner 128 and the item 106. Alternatively, if the resolution of the imager is high enough, sufficient image data may be acquired without the need to adjust the distance. A high resolution imager may be preferred in a flat-bed UPC scanner implementation so the cashier or user can merely slide the merchandise past the reader without the need to adjust the distance there between.

Once the best scanned image has been selected, step 308 may build a geometric point feature model from the image that was selected in step 306. In particular, the scanned image data may be analyzed by the computer 138 to identify visual features. These visual features may be identified using a variety of object recognition processes that can identify various kinds of visual features in an image. In one embodiment of the disclosure, the visual features may correspond to scale-invariant features. The concept of scale-invariant feature transformation (SIFT) has been extensively described by David G. Lowe, "Object Recognition from Local Scale-Invariant Features," Proceedings of the International Conference on Computer Vision, Corfu, Greece, September, 1999 and by David G. Lowe, "Local Feature View Clustering for 3D Object Recognition," Proceedings of the IEEE Conference on Computer Vision and Pattern Recognition, Kauai, Hi., December, 2001; both of which are incorporated herein by reference.

Figure 4:
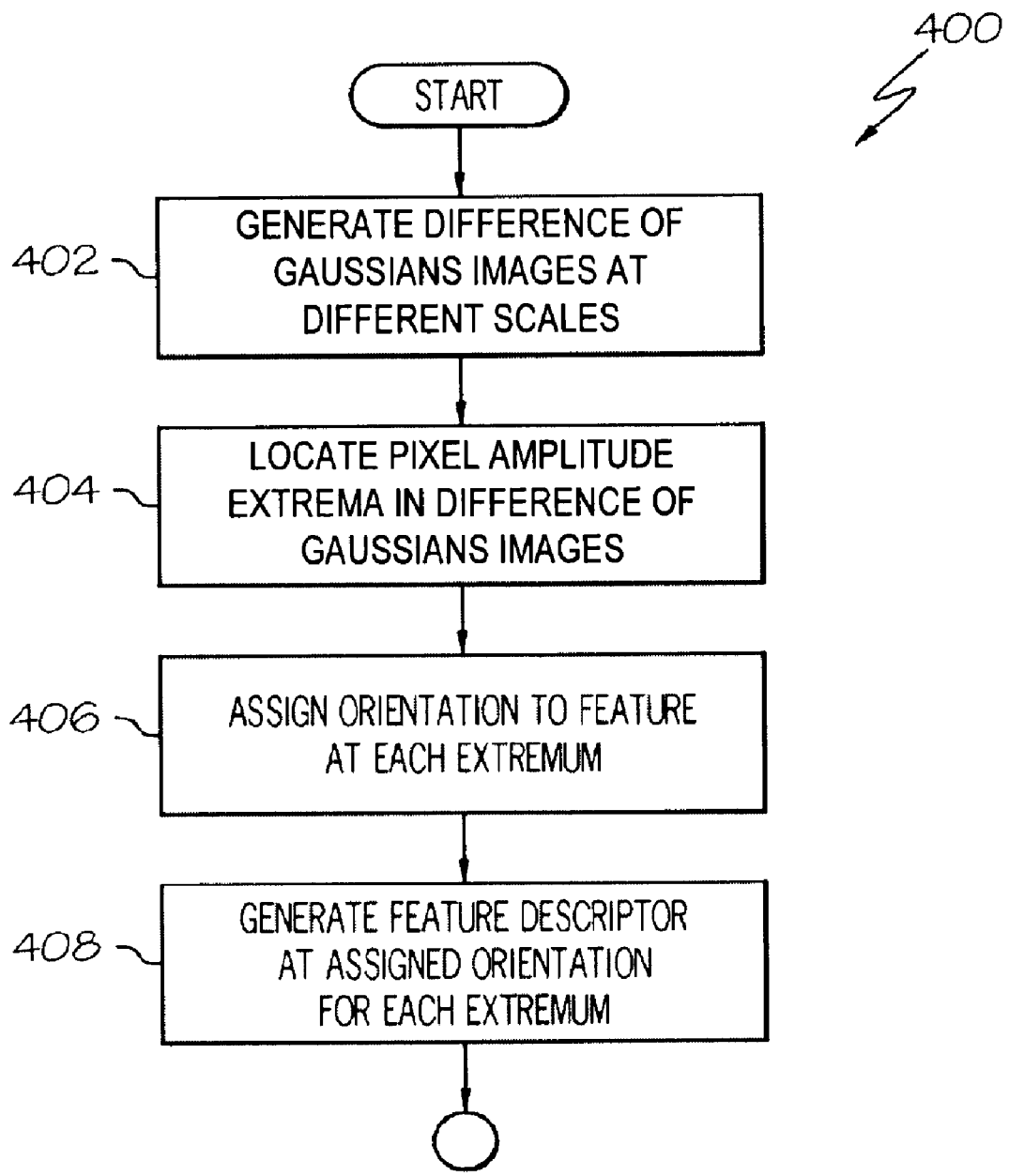
FIG. 4 is a flowchart that illustrates a process for generating feature vectors used in the process illustrated in FIG. 3 in accordance with one embodiment.

In one embodiment of the disclosure, step 308 may be performed using the scale-invariant feature transformation (SIFT) according to the process 400 described in the flow chart shown in FIG. 4. The SIFT process may be performed by the UPC verification server 136, which may include a SIFT processor 144, which includes a feature extractor 142. The scale-invariant features, referred to as SIFT features, also referred to as SIFT vectors, may be extracted from the scanned image that was selected in step 306 using the process 400 shown in FIG. 4.

Referring now to FIG. 4, process 400 begins with step 402, where Difference-of-Gaussians images are generated from the scanned image. It will be appreciated by those skilled in the art that visual features may be extracted from any given image by generating a plurality of Difference-of-Gaussians (DoG) images from the image. A Difference-of-Gaussians image represents a band-pass filtered image produced by subtracting a first copy of the image blurred with a first Gaussian kernel from a second copy of the image blurred with a second Gaussian kernel. This process may be repeated for multiple frequency bands—that is, at different scales—in order to accentuate objects and object features independent of their size and resolution. While image blurring may be achieved using a Gaussian convolution kernel of variable width, one skilled in the art will appreciate that the same results may be achieved by using a fixed-width Gaussian of appropriate variance and variable-resolution images produced by down-sampling the original input image.

In step 404 the DoG images may be inspected to identify the pixel extrema, including minima and maxima. To be selected, an extrema may possess the highest or lowest pixel intensity among the eight adjacent pixels in the same DoG image as well as the corresponding pixel location in the next highest and lowest scale. The identified extrema, which may be referred to herein as image "keypoints," are associated with the center point of visual features. In some embodiments, an improved estimate of the location of each extremum within a DoG image may be determined through interpolation using a 3-dimensional quadratic function to improve feature matching and stability.

With each of the visual features localized, the local image properties may be used to assign an orientation to each of the keypoints in step 406. In one embodiment, the orientation may be derived from an orientation histogram formed from gradient orientations at all points within a circular window around the keypoint. As one skilled in the art will appreciate, it may be beneficial to weight the gradient magnitudes with a circularly-symmetric Gaussian weighting function where the gradients are based on non-adjacent pixels in the vicinity of a keypoint. The peak in the orientation histogram, which corresponds to a dominant direction of the gradients local to a keypoint, is assigned to be the feature's orientation.

With the orientation of each keypoint assigned, in step 408 the SIFT processor 144 may generate a feature descriptor to characterize the image data in a region surrounding each identified keypoint at its respective orientation. In one embodiment, the surrounding region within the associated DoG image may be subdivided into an M×M array of subfields aligned with the keypoint's assigned orientation. Each subfield in turn may be characterized by an orientation histogram having a plurality of bins. Each of the bins represents the sum of the image's gradient magnitudes possessing a direction within a particular angular range and present within the associated subfield. As one skilled in the art will appreciate, generating the feature descriptor from the one DoG image in which the inter-scale extrema is located may ensure that the feature descriptor is largely independent of the scale at which the associated object is depicted in the image. In one embodiment, the feature descriptor may include a 128 byte array corresponding to a 4×4 array of subfields with each subfield including eight bins corresponding to an angular width of 45 degrees. The feature descriptor, also referred to as a SIFT vector, in one embodiment further includes an identifier of the associated image, the scale of the DoG image in which the associated keypoint was identified, the orientation of the feature, and the geometric location of the keypoint in the original image. Once each feature has been identified and given a feature descriptor, the geometric point feature model for the scanned image is complete.

As one skilled in the art will appreciate, other visual features may be used to identify the pictured item including, for example, the scale-invariant and rotation-invariant technique referred to as Speeded Up Robust Features (SURF). The SURF technique uses a Hessian matrix composed of box filters that operates on points of the image to determine the location of keypoints as well as the scale of the image data at which the keypoint is an extremum in scale space. The box filters approximate Gaussian second order derivative filters. An orientation is assigned to the feature based on Gaussian-weighted, Haar-wavelet responses in the horizontal and vertical directions. A square aligned with the assigned orientation is centered about the point for purposes of generating a feature descriptor. Multiple Haar-wavelet responses are generated at multiple points for orthogonal directions in each of 4×4 sub-regions that make up the square. The sum of the wavelet response in direction, together with the polarity and intensity information derived from the absolute values of the wavelet responses, yield a four-dimensional vector for each sub-region and a 64-length feature descriptor. SURF is taught in: Herbert Bay, Tinne Tuytelaars, Luc Van Gool, "SURF: Speeded Up Robust Features", Proceedings of the ninth European Conference on Computer Vision, May 2006, which is hereby incorporated by reference herein.

One skilled in the art will appreciate that there are other feature detectors and feature descriptors that may be employed in combination with the present disclosure. Exemplary feature detectors include the salient region detector that maximizes the entropy within the region, which was proposed by Kadir and Brady, described in "An Affine Invariant Salient Region Detector", T. Kadir and M. Brady, Proceedings of the European Conference on Computer Vision 2004, pp 228-241, which is hereby incorporated by reference; and the edge-based region detector proposed by Jurie et al., described in "Groups of Adjacent Contour Segments for Object Detection", Technical Report 5980, September 2006, Inria, France, which is hereby incorporated by reference; and various affine-invariant feature detectors known to those skilled in the art. Exemplary feature descriptors include Gaussian derivatives, moment invariants, complex features, steerable filters, Gradient Location and Orientation Histogram (GLOH) features, and phase-based local features known to those skilled in the art.

In one embodiment, the geometric feature models for the database images stored in the database 140 may be derived using the same techniques as described above in steps 302, 304, 306 and 308.

Furthermore, the geometric feature models stored in the database 140 may be derived using the SIFT processor 144 performing the SIFT process 400 shown in FIG. 4.

Referring again to FIG. 3, once the geometric point feature model from the scanned image has been constructed, step 310 may retrieve the geometric point feature model corresponding to the UPC 116 read in step 304. Step 312 may then be performed to determine if the scanned image geometric point feature model and the database image geometric point feature models are derived from the same item 106.

Figure 5:
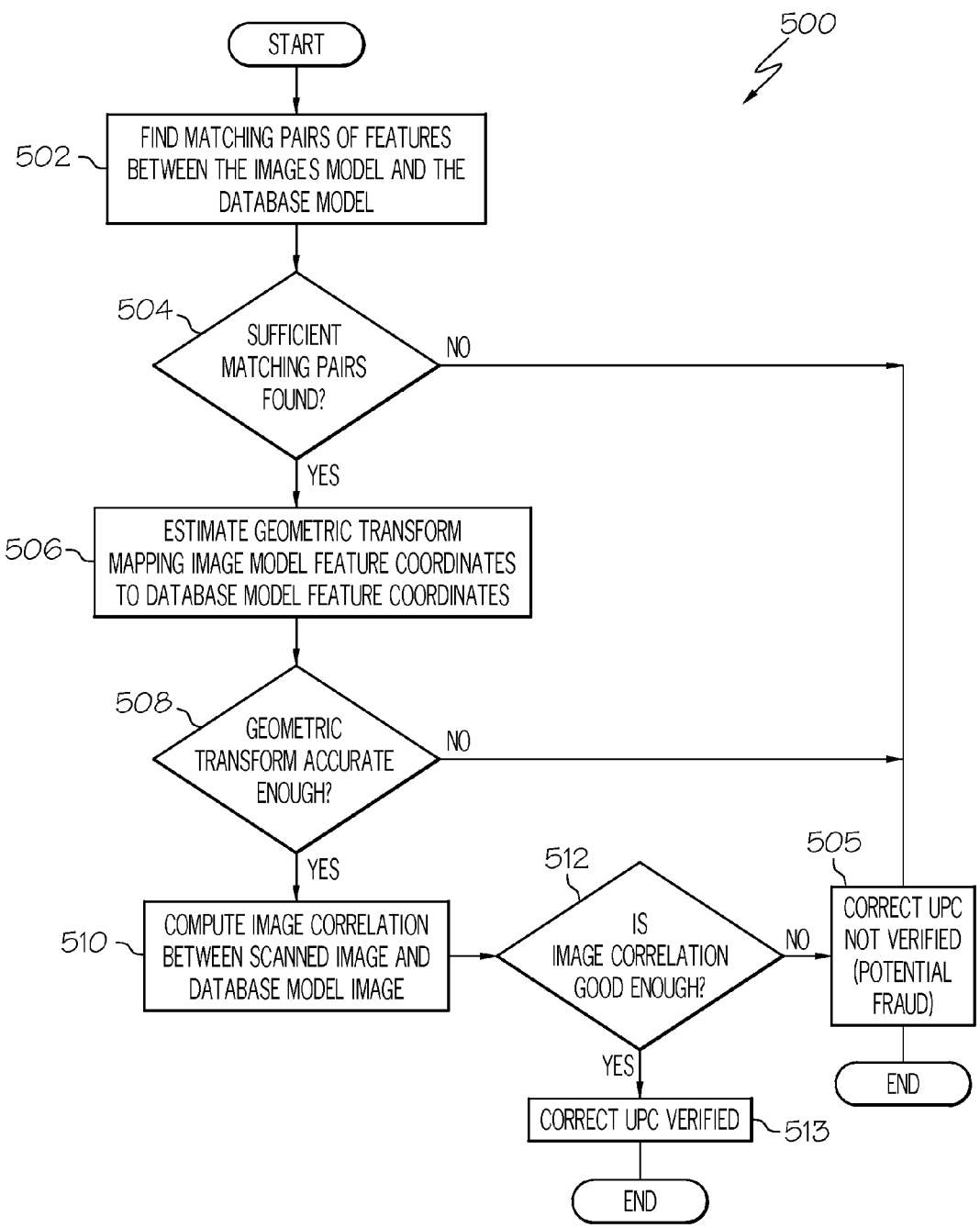
FIG. 5 is a flowchart that illustrates a process for comparing two images of items having UPC codes used in the process illustrated in FIG. 3 in accordance with one embodiment.

Referring now to FIG. 5, in one embodiment, step 312 may be performed using the process 500 shown in FIG. 5. The process 500 begins by finding matching pairs of features between the scanned image and database image feature models, in step 502. These matching pairs of features may be found by a process of searching, feature-by-feature for similar features in the scanned image and database image feature models.

Figure 6:
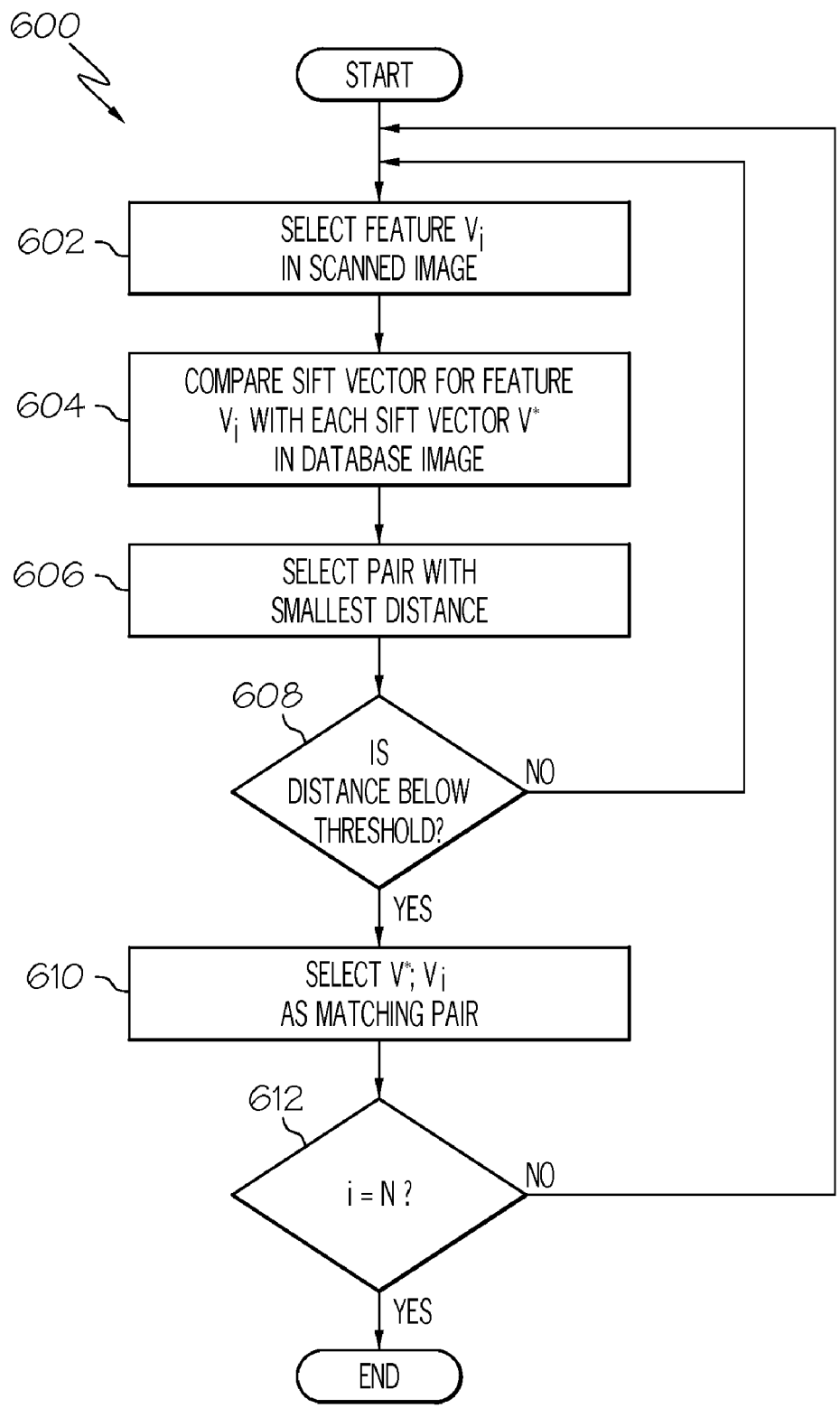
FIG. 6 is a flowchart that illustrates a process for finding matching features used in the process illustrated in FIG. 3 in accordance with one embodiment.

Referring now to FIG. 6, in one embodiment, the process 600 shown in FIG. 6 may be used in step 502 to find the matching features. Process 600 may begin with step 602 by first selecting a feature in the scanned image geometric point feature model. Once the first feature is selected, step 604 may begin a search for similar features in the database image geometric point feature model. This may be done by comparing the SIFT vector of the selected feature with each feature in the database image geometric point feature model and selecting the database feature with the smallest distance (where the Euclidean norm of the difference of the two vectors is used as a distance measure), as shown in step 606. The smallest distance value may then be compared to a predetermined threshold in step 608. If the smallest distance value is not lower than the threshold, it may mean that the features are not similar enough to be considered to be a match, and the process may return to step 602, where a new feature $v_i$ may be selected and processed.

If step 608 determines that the smallest distance is below the threshold, the pairs of features may be selected as a matching pair in step 610. The process then may move to step 612 to determine if all the N number of features in the image have been processed. If not, the process may return to step 602 and may repeat steps 602-612 until all N of the features in the image have been processed. Once the last feature has been processed as determined by step 612, the process may proceed to step 504 in FIG. 5.

In another embodiment, matching pairs may also be clustered based on relative scale, translation and orientation. Matching pairs that are in the same cluster may be highly likely to be mappable with a geometric transform. Further details of this process are extensively described in U.S. Pat. No. 6,711,293 issued Mar. 23, 2004, which is hereby incorporated by reference herein. Referring again to FIG. 5, after step 502 has found a set of matching pairs, step 504 may determine if there is a sufficient number of matching pairs. This minimum threshold number may depend on the application, but may typically be about four, because four may be a minimum number of matching pairs needed to compute a geometric transformation, as described below. However, a higher threshold may be employed for increased reliability of verification.

If the number of matching pairs is below the predetermined threshold, the scanned image may not be likely to be the same item as the database image associated with the scanned UPC 116. Step 505 may then conclude that the UPC has not been verified and hence the scanned image and the database image may not be the same. The process 500 then may move to step 312 in FIG. 3.

Referring again to FIG. 3, if the process 500 determines that the scanned image is not verified based on the database image, the process 300 then may move to step 314. In step 314 some action may be taken that will give notice to the POS terminal 118 that a potential UPC substitution fraud has been detected. The particular action taken in response to such notice may vary depending on the application, but may include, for example, preventing the sale of the item 106 from being completed, asking the checkout person 110 to manually verify the identity of the package, contacting security personnel, or other appropriate actions.

Returning again to FIG. 5, if step 504 determined that a sufficient number of matching pairs has been found, step 506 may then estimate a geometric transform that may map the scanned image model feature coordinates with the database image model feature coordinates. In general, the desired geometric transform may define how the features in the image would need to be "shifted" so that they would be at the same position as the database features. This may be necessary because differences in the manner that the scanned and database images of the item were captured may result in differences in the two images even if they are of the same item. For example, there may be differences in scale (both uniform and non-uniform), rotation, translation, shearing and perspective. The geometric transform may compensate for these differences so that if the two images are of the same item, all the features may line up with each other at the same coordinate positions.

In one embodiment, the geometric transform that is used may be either an affine transform or a homography. As will be appreciated by those skilled in the art, an affine transform can be used to describe image translation, rotation, uniform and non-uniform scaling and shearing, but not perspective. A homography can describe transformations involving perspective. Thus, in applications where there may be significant differences in perspective, it may be more advantageous to use a homography transform.

In creating the desired geometric transform, the following definitions may be used:

$X_{MODEL}$: coordinates of the features in the database model $X_{IMAGE}$: coordinates of the matching features in the image $X_{PROJ}$: coordinates of the image features projected onto the database model where, e: residual error between the projected image coordinates and the database coordinates A: affine or homographic transform matrix $$X_{PROJ} = A \cdot X_{IMAGE} \quad (1)$$

$$e = X_{PROJ} - X_{MODEL} = A \cdot X_{IMAGE} - X_{MODEL} \quad (2)$$

which yields, $$X_{MODEL} = A \cdot X_{IMAGE} + e \quad (3)$$

Hence, in accordance with this embodiment, step 506 in FIG. 5 may be performed by finding the transform matrix A that minimizes the norm of the error e, using known methods of linear algebra to find the least squares solution. The goal is to map a sufficient number of features with sufficiently low error e.

Step 508 may determine whether the geometric transform found in step 506 is accurate enough, or valid. One validity test is to verify that the residual error, e, is sufficiently low; typically less than four pixels of error for a VGA sensor, or measured as a fraction of the size of the object in the image. Another test is to verify how close the transform is to a similarity, that is, that there is no shearing and the scaling is nearly the same in all directions. In more detail, if A is an affine translation matrix, where T is the translation, Q is the scaling and rotation, U,V are orthogonal or orthonormal matrices that do the rotation, and S is a diagonal matrix that does the scaling/stretching, then, $$A = \begin{bmatrix} Q & T \\ 0 & 0 & 1 \end{bmatrix} \quad (4)$$

and, $$Q = U \cdot S \cdot V^T. \quad (5)$$

Equation 5 is the singular value decomposition of Q, and, $$\begin{bmatrix} \sigma_1 & 0 \\ 0 & \sigma_2 \end{bmatrix} \quad (6)$$

are the singular values, where $\sigma_1$ and $\sigma_2$ are the largest and smallest scaling respectively. A is close to a similarity if $$\|\sigma_1/\sigma_2\| \leq 1+\epsilon, \quad (7)$$

where $\epsilon$ is small. That is, A is a similarity if the two singular values are similar in value. In practice, an acceptable range for the values of $\sigma_1$ and $\sigma_2$ may be defined as when these values are within 5% to 10% of each other, that is, $\epsilon$ is between 0.05 and 0.1.

If $\epsilon$ is not within an acceptable range, step 508 may determine that the geometric transform is not valid, that is, not accurate enough for it to be likely that the scanned image and the database image are images of the same item. The process may then move to step 505 where a determination may be made that the UPC is not verified. The process may then move from step 312 in FIG. 3 to step 314 and notification of a potential fraudulent UPC may be issued to the POS terminal 118. In the alternative, one skilled in the art may use homography to compensate for distortion due to perspective.

Figure 7:
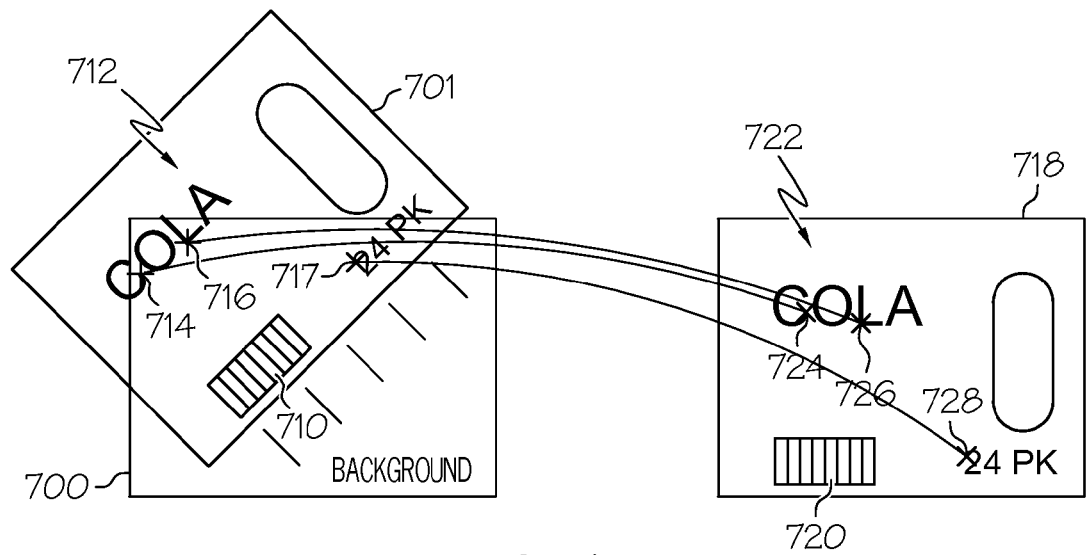
FIG. 7 is a diagram of scanned and database images of items having UPCs in accordance with one embodiment.

If step 508 determines that the geometric transform is valid, step 510 may compute an image correlation between the scanned image and the database image. Referring now to FIG. 7, a scanned image 700 is shown, with the actual scanned product 701 disposed at an angle with respect to the scanned image 700. The scanned image 700 may include a UPC 710, product labeling 712 and three features, 714, 716 and 717. Features 714, 716 and 717 may be three of the features identified in process 400 shown in FIG. 4. A database image 718 also may include a UPC code 720, product labeling 722, and three features 724, 726 and 728. Features 714 and 724 may be one of the pairs of features identified in the process 500 shown in FIG. 5. Likewise, feature pairs 716-726 and 717-728 may be two other pairs of features identified in the process 500 shown in FIG. 5. As shown in FIG. 7, image 700 may appear translated in the x and y axis, smaller in scale and rotated as compared to the image 718. The geometric transformation A, discussed above, describes the transformation required to map the features 714, 716 and 717 onto features 724, 726 and 728, respectively.

While these individual features may have matched well enough to meet the determination in step 508, step 510 may be used to see if the two images as a whole match, or correlate. It is possible, for example, for two items to have a number of matching features, while still being images of different products. For example, image 700 might be the same as image 718 except that it may include the label "12 PK" instead of "24 PK" as in image 718. In accordance with one embodiment, image correlation in step 510 may be used to detect such subtle differences where a fraudulent UPC has been applied. Image correlation may be accomplished by applying the transform A to the entire image. This may "warp" the scanned image 700 to align it with the database image 718.

Figure 8:
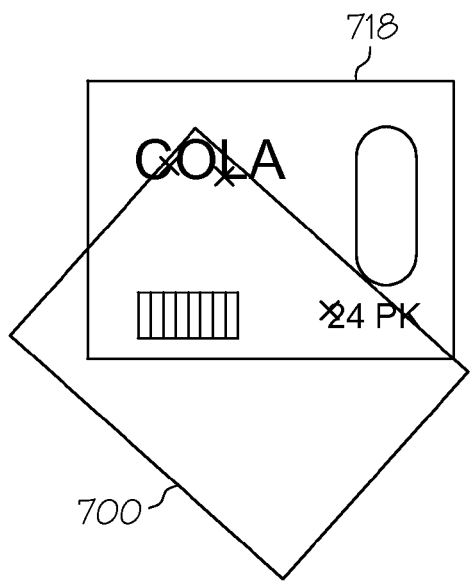
FIG. 8 is a diagram of a transformed scanned image and a database image in accordance with one embodiment.
Figure 9:
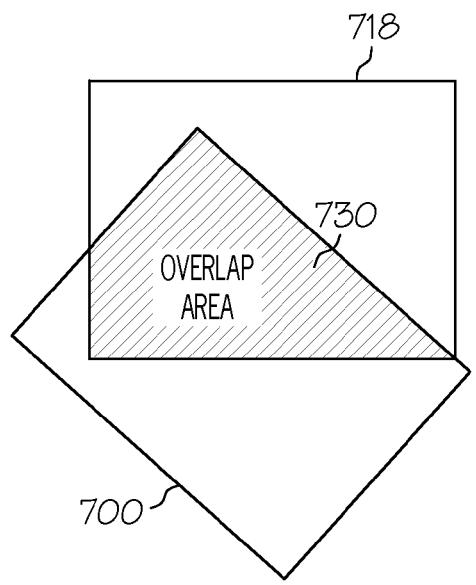
FIG. 9 is a diagram of the overlapping areas of scanned and database images in accordance with one embodiment.

FIG. 8 shows the results of the transformation of image 700 onto image 718 using the transform A. After the transformation, the pixel values over the overlapping region can be compared. First, the overlapping region may be separated out from the background as shown in FIG. 9 using the known boundary of the model. This may result in the definition of an overlapping region 730. Next, a normalized image correlation may be computed over the overlapping region 730 as follows. Let v and w be vectors listing (in the same order) the pixel brightness values in the overlapping region of interest for the transformed scanned image 700, and the database image 718 respectively. Then, the normalized image correlation may be defined as:

$$c = \frac{v \cdot w}{\|v\| \cdot \|w\|} \qquad (8)$$

where v•w denotes a vector product and $\|v\|$ is the vector norm of v. The correlation value c ranges from $-1 \leq c \leq 1$. If c is close to 0, the two images may be poorly correlated, and may not be the same. If c is close to 1, then the two images may be highly correlated and the images may be the same.

Referring again to FIG. 5, the process 500 then may move to step 512 where a determination may be made if the correlation is good enough. For example, the threshold may be set at 0.95. In this case, if c is below 0.95 step 512 may conclude that the correlation is not good enough and the process may move to step 505 and then to step 314 where a notice of a fraudulent UPC may be issued. If instead, the correlation is at least 0.95, for example, step 512 may conclude that the correlation is good enough and step 513 may verify that the UPC is valid, and the process 300 may move to step 316 which may allow the POS system 120 to proceed with the purchase of item 106.

As described above, embodiments of the system and method of the present disclosure may advantageously permit the detection of a fraudulent UPC code on goods as they are being purchased. The system and method of the present disclosure may also be advantageously used to identify fraudulent or mislabeled UPC codes on items in other settings such as baggage handling systems and warehouses. The system and method of the present disclosure may also be used to detect a fraudulent or mislabeled identifier besides a UPC such as an RFID.

It should be understood, of course, that the foregoing relates to exemplary embodiments of the invention and that modifications may be made without departing from the spirit and scope of the invention as set forth in the following claims.

I claim:

1. A method of confirming the identity of an item including an identifier, the method comprising:
   acquiring an image of the item including the identifier;
   extracting a first set of geometric point features from the image of the item;
   reading identification code data from the identifier included with the item;
   retrieving from a database a second set of geometric point features based on the identification code data, the database comprising sets of geometric point features associated with a plurality of known items;
   comparing via a processor the first set of geometric point features from the image with the second set of geometric point features retrieved based on the identification code data; and
   determining whether the item in the image corresponds to the identification code data read from the identifier included with the item based on the comparing of the first set of geometric point features with the second set of geometric point features.

2. The method of claim 1, wherein the identifier is a universal product code (UPC) barcode or a radio-frequency identification (RFID) tag.

3. The method of claim 1, wherein the first set of geometric point features and second set of geometric point features are scale-invariant feature transform (SIFT) features.

4. The method of claim 1, wherein the second set of geometric point features corresponds to a feature model of one of the plurality of known items in the database.

5. The method of claim 1, wherein the step of acquiring the image of the item is performed in a point of sale system.

6. The method of claim 1, wherein the step of comparing the first set of geometric point features with the second set of geometric point features comprises:
   generating a geometric transform for mapping one or more of the geometric point features of the first set of geometric point features to one or more of the geometric point features of the second set of geometric point features.

7. The method of claim 6, wherein generating the geometric transform minimizes an error associated with the mapping of said one or more of the geometric point features of the first set of geometric point features to said one or more of the geometric point features of the second set of geometric point features.

8. The method of claim 7, wherein the geometric transform is an affine transform or homography.

9. The method of claim 1, wherein the step of comparing further comprises:
   generating an image correlation between the acquired image of the item and an image of at least one of the plurality of known items.

10. The method of claim 9, wherein the step of generating an image correlation comprises:
    determining an overlapping region between the acquired image of the item and the image of at least one of the plurality of known items; and
    determining a correlation value for the overlapping region.

11. A system for confirming the identity of an item including an identification code, the system comprising:
    an optical sensor for capturing an image of the item including the identification code;
    a feature extractor coupled to the optical sensor for extracting geometric point features from the image;
    a database comprising a plurality of feature models, each feature model comprising one or more geometric point features, and each feature model associated with at least one of a plurality of known items; and
    a processor configured to:
    a) compare the extracted geometric point features to the geometric point features of a feature model stored in the database and selected based on the identification code included with the item; and
    b) determine whether the item in the image corresponds to the identification code included with the item based on comparison of the extracted geometric point features to the geometric point features of the feature model selected based on the identification code.

12. The system of claim 11, wherein the optical sensor further comprises a code scanner for scanning the identification code included with the item.

13. The system of claim 12, wherein the code scanner comprises a laser incorporated in the optical sensor.

14. The system of claim 12, wherein the optical sensor comprises a two-dimensional imager.

15. The system of claim 14, wherein the code scanner comprises a processor configured to read the identification code based on the image of the item captured by the two-dimensional imager.

16. The system of claim 12, wherein the code scanner is substantially fixed in a horizontal or vertical position, whereby the identification code is read when the item is passed by the code scanner.

17. The system of claim 12, wherein the code scanner is a handheld scanner adapted to be pointed at or waived over the identification code.

18. The system of claim 17, wherein the handheld scanner comprises a distance indicator configured to signal to a user whether to move the handheld scanner closer to the item or further away from the item.

19. The system of claim 18, wherein the handheld scanner is configured to signal the user to move the handheld scanner away from the item if only a portion of the item is in a field of view of the optical sensor.

20. The system of claim 11, wherein the extracted geometric point features are scale-invariant feature transform (SIFT) features.

21. The system of claim 20, wherein the feature extractor is further configured to:
    generate Difference-of-Gaussians images from the image of the item;
    locate pixel amplitude extrema in the Difference-of-Gaussians images;
    assign an orientation to each of the extracted geometric point features at each extremum; and
    generate a feature descriptor for each of the extracted geometric point features at the assigned orientation.

22. A method of preventing fraudulent purchases of products including identification codes, comprising:
    scanning an identification code included with a product using a point of sale system;
    acquiring an image of the product;
    generating geometric feature data from the acquired image of the product;
    retrieving feature data associated with merchandise based on the scanned identification code;
    identifying via a processor matching features between the generated geometric feature data and the retrieved feature data, wherein a number of matching features is identified; and
    generating an alert if the number of identified matching features is below a predetermined threshold.

23. The method of claim 22, wherein the step of identifying matching features comprises:
    comparing scale-invariant feature transformation vectors associated with the generated geometric feature data with scale-invariant transformation vectors associated with the retrieved feature data;
    identifying pairs of features with a minimal difference in scale-invariant feature transformation vectors;
    determining if the minimal difference in scale-invariant feature transformation vectors is below a second threshold; and
    selecting pairs of features as matching pairs if the minimal difference in scale-invariant feature transformation vectors is below the second threshold.

24. A method of verifying the identity of an item including an identifier, the method comprising:
    acquiring an image of the item including the identifier;
    reading identification code data from the identifier included with the item;
    extracting a first set of geometric point features from the image of the item;
    comparing via a processor the first set of geometric point features from the image with geometric point features from a database, the geometric point features from the database being associated with a plurality of known items;
    retrieving identification code data from the database based on a match between the first set of geometric point features and geometric point features from the database that are associated with one of the plurality of known items; and
    determining whether the identification code data read from the identifier included with the item matches the identification code data retrieved from the feature database.

25. The method of claim 22, wherein the generated geometric feature data correspond to generated geometric features having acquired image coordinates and the retrieved feature data correspond to stored geometric features of one or more stored images of a known product of the merchandise, the stored geometric features having stored image coordinates, and wherein each of the matching features corresponds to a pair of a generated geometric feature and an associated stored geometric feature that match, the method further comprising:
    generating a geometric transform for ones of the pairs of the generated geometric features and the associated stored geometric features, the geometric transform for implementing a mapping between the acquired image coordinates of the generated geometric features and the stored image coordinates of the associated stored geometric features, and the geometric transform providing a residual projection error of the mapping;
    comparing the residual projection error of the mapping to an error threshold to determine an accuracy of the geometric transform;
    if the residual projection error is less than the error threshold, computing an image correlation value corresponding to a correlation between the acquired image of the product and said one or more stored images of the known product of the merchandise;
    comparing the image correlation value to a correlation threshold; and
    generating the alert if the image correlation value is below the correlation threshold.

* * * * *

UNITED STATES PATENT AND TRADEMARK OFFICE
CERTIFICATE OF CORRECTION

| | |
|---|---|
| PATENT NO. | : 8,068,674 B2 |
| APPLICATION NO. | : 11/849503 |
| DATED | : November 29, 2011 |
| INVENTOR(S) | : Goncalves |

It is certified that error appears in the above-identified patent and that said Letters Patent is hereby corrected as shown below:

In column 1, line 52, replace "product" with --products--.

In column 1, line 64, after "database", insert --was acquired--.

In column 2, line 5, delete "a" before "also".

In column 2, line 60, after "identifier", delete ", the method".

In column 3, line 48, replace "storage" with --storing--.

In column 5, line 61, before "not", insert --is--.

In column 6, line 39, replace "stored" with --supplied--.

In column 6, line 48, replace "stored" with --supplied--.

In column 8, line 29, delete "an" before "extrema".

In column 8, line 64, replace "is" with --are--.

In column 9, line 27, before "direction", insert --each--.

In column 9, line 29, replace "yield" with --yields--.

In column 9, line 67, replace "models" with --model--.

In column 12, line 5, delete ",".

In column 16, line, 26, delete "feature".

Signed and Sealed this
Twenty-seventh Day of March, 2012

David J. Kappos
*Director of the United States Patent and Trademark Office*